(12) United States Patent
Woodmansee et al.

(10) Patent No.: US 6,734,842 B2
(45) Date of Patent: May 11, 2004

(54) PORTABLE AND WEARABLE DATA ENTRY APPARATUS

(75) Inventors: Donald Ernest Woodmansee, Simpsonville, SC (US); Jeanette Marie Bruno, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 09/845,247

(22) Filed: May 1, 2001

(65) Prior Publication Data

US 2002/0163494 A1 Nov. 7, 2002

(51) Int. Cl.⁷ .............................. G09G 5/00; H05K 5/00
(52) U.S. Cl. ....................... 345/169; 345/905; 361/683
(58) Field of Search ................................. 361/680, 681, 361/682, 683, 684, 685, 686; 345/156, 168, 169, 173, 905; 235/462.44, 462.45, 472.01; 341/22; 224/218, 222, 624, 175

(56) References Cited

U.S. PATENT DOCUMENTS

| 4,284,220 | A | | 8/1981 | Nice | |
|---|---|---|---|---|---|
| 4,988,229 | A | | 1/1991 | Ramsey, III | |
| 5,305,181 | A | * | 4/1994 | Schultz | 361/680 |
| 5,309,328 | A | * | 5/1994 | Lum | 361/809 |
| 5,416,730 | A | * | 5/1995 | Lookofsky | 361/680 |
| 5,581,492 | A | * | 12/1996 | Janik | 361/683 |
| 5,610,387 | A | * | 3/1997 | Bard et al. | 235/462.44 |
| 5,657,201 | A | * | 8/1997 | Kochis | 361/686 |
| 5,808,289 | A | * | 9/1998 | Becker | 235/472.01 |
| 6,108,197 | A | * | 8/2000 | Janik | 361/683 |
| 6,134,102 | A | * | 10/2000 | Worn et al. | 361/683 |
| 6,184,804 | B1 | * | 2/2001 | Harrison | 341/22 |
| 6,330,961 | B1 | * | 12/2001 | Borja | 224/222 |
| 6,356,437 | B1 | * | 3/2002 | Mitchell et al. | 361/683 |
| 6,360,928 | B1 | * | 3/2002 | Russo | 224/218 |

OTHER PUBLICATIONS

Thompson et al., "Wearable Computer Based Training and Performance Support Systems", Wearable Computer, Article for Georgia Tech Research Institute, Atlanta, GA, Aug. 7, 2001, pp. 1–13.

* cited by examiner

Primary Examiner—Steven Saras
Assistant Examiner—Paul A. Bell
(74) Attorney, Agent, or Firm—Nixon & Vanderhye

(57) ABSTRACT

A portable data entry apparatus adapted to be carried by a user including a planar member having top and bottom surfaces. A data entry device is secured to the top surface of the planar member leaving a gap therebetween. A first member is detachably attached to the bottom surface and towards a first edge of the planar member, and a second member is secured to the bottom surface and away from the first edge, the second member enabling a user's forearm to support the data entry apparatus.

16 Claims, 5 Drawing Sheets

PORTABLE AND WEARABLE DATA ENTRY APPARATUS

FIELD OF THE INVENTION

This invention relates to data entry apparatus, more particularly, to an apparatus adapted to be carried by a user for field data entry.

BACKGROUND OF THE INVENTION

It is known that computer systems are available in a variety of configurations. Portable computers are one category of computer systems that may be used in a number of locations. For example, one common type of portable computing system is the common notebook personal computer with a keyboard and display screen that folds on top of the keyboard for transportation. The notebook personal computer is quite portable when compared to desktop equivalents, and may be transported and used in a variety of selected locations. However, these notebook computers, and many other smaller computer equivalents must often be used with the aid of a table or desk, preferably with the user in a seated position. For example, the architecture of virtually all notebook computers and similarly sized computers require the user to be seated with the computer, preferably on an elevated working surface. Indeed, one would find it almost impossible to work in a standing position with such a computer without a working surface.

Direct entry of digital inspection data on a shop floor or in a manufacturing plant environment has been impractical using notebook/laptop computers (PCs). Further, even screen entry PCs prove to be impractical as they require a place to be set down, and most commonly, a keyboard is needed for data entry.

Another class of computers adapted to be worn by a user designed so that the main components of the computer are generally supported by, or upon, a user's body. In one approach, a hip mounted PC system having a head supported display is used, the display being in focus with the user's eye. Data entry is performed by using voice recognition, and the entered information appears on a screen strapped to the user's forearm. In this approach, the user must talk or look at the display on the eye piece, and the key-board is strapped to the user's hand. This arrangement is suitable only for a single user since no one else can see the display image. Further, this approach is cumbersome, requiring that the user affix the components to his/her person in a series of carefully planned steps. Similarly, the affixed parts cannot be removed and transferred to another user very quickly.

Other approaches in the area of portable data entry use a holster-mounted single-hand computer entry systems, such as, for example, systems used by grocery store inventory personnel, and also the use of personnel-mounted computer systems, with various parts of the computer system including it's input/output systems dispersed in several places around a user's body. In the first case, the computers are small, specialized devices with very small screens for digital displays and a predefined array of keys for specified data entry. In the second case, the computers are indeed general purpose, but the displays are provided as eyebrow screen reflections visible only to the computer wearer. While both types of computer systems have certain advantages in particular environments, there is a need for more general purpose, less expensive, more robust, and safer to use portable data entry apparatus.

BRIEF SUMMARY OF THE INVENTION

Accordingly, the present invention relates to a portable data entry apparatus that overcomes the above identified problems. The data entry apparatus of the present invention includes a support panel holding a data entry computing device secured to a upper surface of the support panel such that a gap is left between the data entry computing device and the upper surface of the support panel. The data entry computing device is a screen-entry personal computer with a display device. This gap enables heat generated by the data entry device to dissipate more readily. A hand grip member is attached so that it is disposed normal to a bottom surface of the support panel. A formed plastic cast attached to the bottom surface of the support panel enables a user to support and raise the data entry apparatus to a working position for facilitating data entry using his/her forearm (near the elbow). A VELCRO™, or other press-on, pull-off retained strap attached to the cast member, may be wrapped around the user's forearm for added protection to prevent accidental dropping of the data entry apparatus. The data entry apparatus further includes a shoulder strap to enable a user to easily carry the data entry apparatus without the use of the hands, until such time as the data entry process is to begin.

In a parked position on the shoulder strap, the handgrip member faces away from user. In order to position the apparatus for data entry, user's forearm is passed through the strap attached to the cast member to hold the hand-grip member. The user then raises the apparatus until the data entry device directly faces the user. At this point the user may adjust the shoulder strap to transfer the weight of the apparatus the user's shoulders. The user may thus be able to relax the forearm supporting the apparatus. This invention also addresses the ergonomics of using a hand-held data entry apparatus by transferring some of the weight of the apparatus from the forearm to shoulders of the user.

After entering data, the apparatus may be quickly released and allowed to hang at the user's hip, to enable quick parking of the apparatus on a user when not in use. In the parked position, the data entry computing device is protected by the support apparatus from external impacts that might cause damage to the data entry device. Thus, this invention provides an ergonomically friendly, robust, safe, and inexpensive general purpose data entry apparatus for use in factory environments where the apparatus must be carried by personnel to a site, and be held on the person while entering field data.

In one aspect, the present invention provides a data entry apparatus adapted to be carried by a user including a planar member having top and bottom surfaces; a data entry device secured to the top surface leaving a gap therebetween; a first member detachably secured to the bottom surface and towards a first edge of the planar member; and a second member secured to the bottom surface and away from the first edge, the second member enabling a user's forearm to support to the data entry apparatus. The apparatus further includes a protective member attached to the planar member, the protective member being disposed to operate in open and fold down positions to protect a display unit of the data entry device.

The protective member provides abrasion protection to the display device of the data entry device. The dimensions of the planar member are greater than the dimensions of the data entry device. Further the first member is attached such that it is normal to the planar member. The data entry apparatus further includes a strap assembly attached to the planar member by a rope harness, the strap assembly enabling a user to carry the data entry apparatus over the user's shoulder without using hands. The second member comprises a strap unit for securing the user's forearm to the second member to prevent accidental dropping of the data entry apparatus; and a guard member attached to the second member for protecting the user's forearm.

The first member preferably protects the data entry device from accidental impacts. The first member is a flexible loop strap secured to the planar member by a wingnut fastener. The first member may also be a rigid handgrip member.

The data entry device is attached to the planar member so as to enable natural convection cooling and to minimize heat transmission to a user. The data entry apparatus also has a stylus for enabling data entry; a clip member secured to the top surface; and a lock mechanism for securing the data entry apparatus. The strap assembly enables a user to hold the data entry device in a presentation position. The strap assembly further provides vertical support for the apparatus during data entry.

In another aspect, an apparatus adapted to be carried by a user for data entry including a planar member having a top surface and a bottom surface; a data entry device secured to the top surface; a first means detachably secured to the bottom surface and towards a first edge of the planar member, the first means enabling a user's forearm to support the apparatus; and a second means secured to the bottom surface of the planar member and away from the first edge.

A gap is provided between said data entry device and the top surface of the planar member. The apparatus further includes a third means secured to the top surface of the planar member for protecting the data entry device, the third means disposed to operate in open and fold down positions.

In yet another aspect, a data entry apparatus adapted to be carried by a user including a planar member having a top surface and a bottom surface; a data entry computing device secured to the top surface leaving a gap therebetween; a first member detachably secured to the bottom surface and towards a first edge of the planar member, the first member being used as a handgrip member while the apparatus is mounted on the user's forearm; and a second member secured to the bottom surface and away from the first edge, the second member enabling a user's forearm to support to the data entry apparatus. The apparatus further includes a protective member attached to the planar member, the protective member being disposed to operate in open (data entry) and fold down (carry) positions to provide a visor to minimize reflections during data entry, the protective member further enabling to protect a display unit of the data entry device when the apparatus is hanging by a shoulder strap at the user's side.

DETAILED DESCRIPTION OF THE INVENTION

Figure 1:
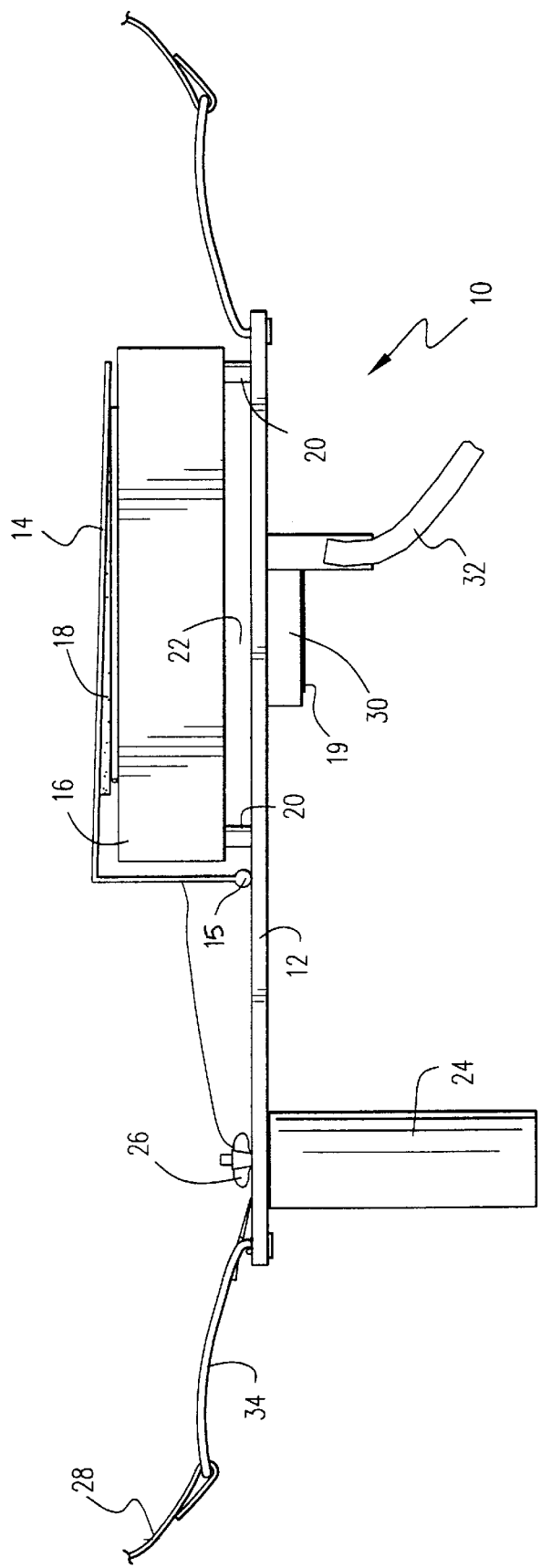
FIG. 1 shows a side sectional view of the data entry apparatus according to the present invention.

Referring now to FIG. 1, there is shown a side sectional view of the data entry apparatus 10 in accordance with the present invention. Apparatus 10 includes a support panel 12 for supporting various components of apparatus 10. A data entry computing device 16 is secured to a top surface of support panel 12 leaving a gap 22 between a lower surface of device 16 and the top surface of panel 12. Gap 22 facilitates to dissipate heat generated by device 16. Device 16 may be for example, a screen data entry computer. In the preferred embodiment, a screen data entry computer is used. The data entry device 16 includes processing and storage capabilities similar to a portable computing device. Data may be entered into device 16 in a variety of ways which include, for example, speaking to the device and recognizing the spoken information by means of a voice recognition software, by touch sensitive display a software keyboard on the display device and selecting the characters from the software keyboard. An interface may be provided to device 16 to attach an external keyboard. A screen protector/visor 14 is pivotally attached as indicated at 15 to panel 12. Visor 14 affords screen protection to the display unit of device 16. The dimensions of visor 14 preferably match the dimensions of a display unit of device 16.

A handgrip member 24 is detachably secured to one end of the bottom surface, away from a user's body, of the support panel 12. The handgrip member 24 is preferably secured by means of a screw type faster 26, such as for example, a wing nut fastener, which may be operated to enable the handgrip member 24 to be detached when apparatus 10 is being prepared to be stored in a carrying case (not shown). Fastener 26 may be tethered to visor 14 to ensure its ready availability while re-assembling apparatus 10. The handgrip member 24 provides a stable platform for data entry, but it must be disassembled from the support panel 12 when using the data entry computing device 16 as a desktop unit.

In another embodiment, the handgrip member 24 may be a flexible loop strap held in tension by the operator's hand under the apparatus. When not in the carrying position, the loop strap simply hangs off the support panel 12, folds under the data entry device 16 when it is used as a desktop computer. The embodiment provides no obstruction when apparatus 10 is hung on an operator by strap 28.

A cast member 30 is secured to the bottom surface of panel 12 and away from handgrip member 24 for enabling a user's forearm to support and raise apparatus 10 to a working position for facilitating data entry. The cast member 30 is further provided with a strap member 32 made of a material such as, for example, VELCRO™, for strapping around a user's forearm to prevent apparatus 10 from being dropped.

Figure 2:
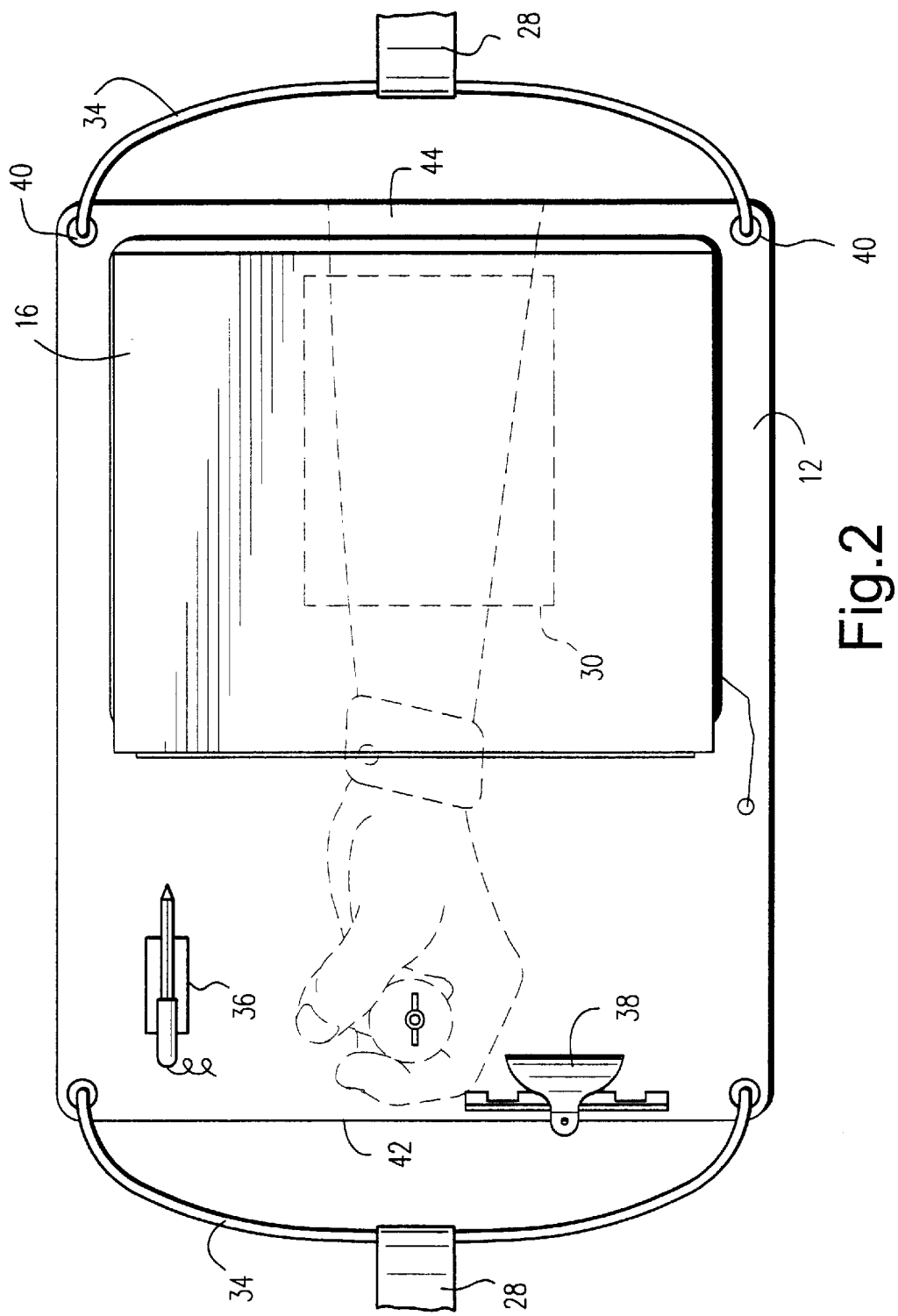
FIG. 2 shows a plan view of the data entry apparatus as shown in FIG. 1.

Referring now to FIG. 2, there is shown a plan view of the data entry apparatus 10 of FIG. 1. Panel 12 includes a set of holes 40, each set being disposed near edges 42, 44 of support panel 12. A rope harness 34 is passed through each set of holes 40 for enabling panel 12 to be secured to a strap member 28. Strap member 28 enables a user to wear apparatus 10 around the user's shoulder. One end of a strap member 28 is slidably secured to the rope harness 34 disposed towards edge 42 of support panel 12, while the other end of the strap member 28 is slidably secured to rope harness 34 disposed near an edge 44 which is opposite to edge 42. Strap member 28 and the member 24 independently secure apparatus 10 from being dropped. Further, rope harness 34 and member 28 operate to enable a user to transfer the weight of apparatus 10 from a user's forearm to user's shoulders during data entry, thus providing relief to the user's forearm. A spring clip member 38 is provided on the top surface of panel 12 for holding paper documents and the like. Panel 12 is also provided with stylus 36 for enabling data entry into device 16.

Figure 3:
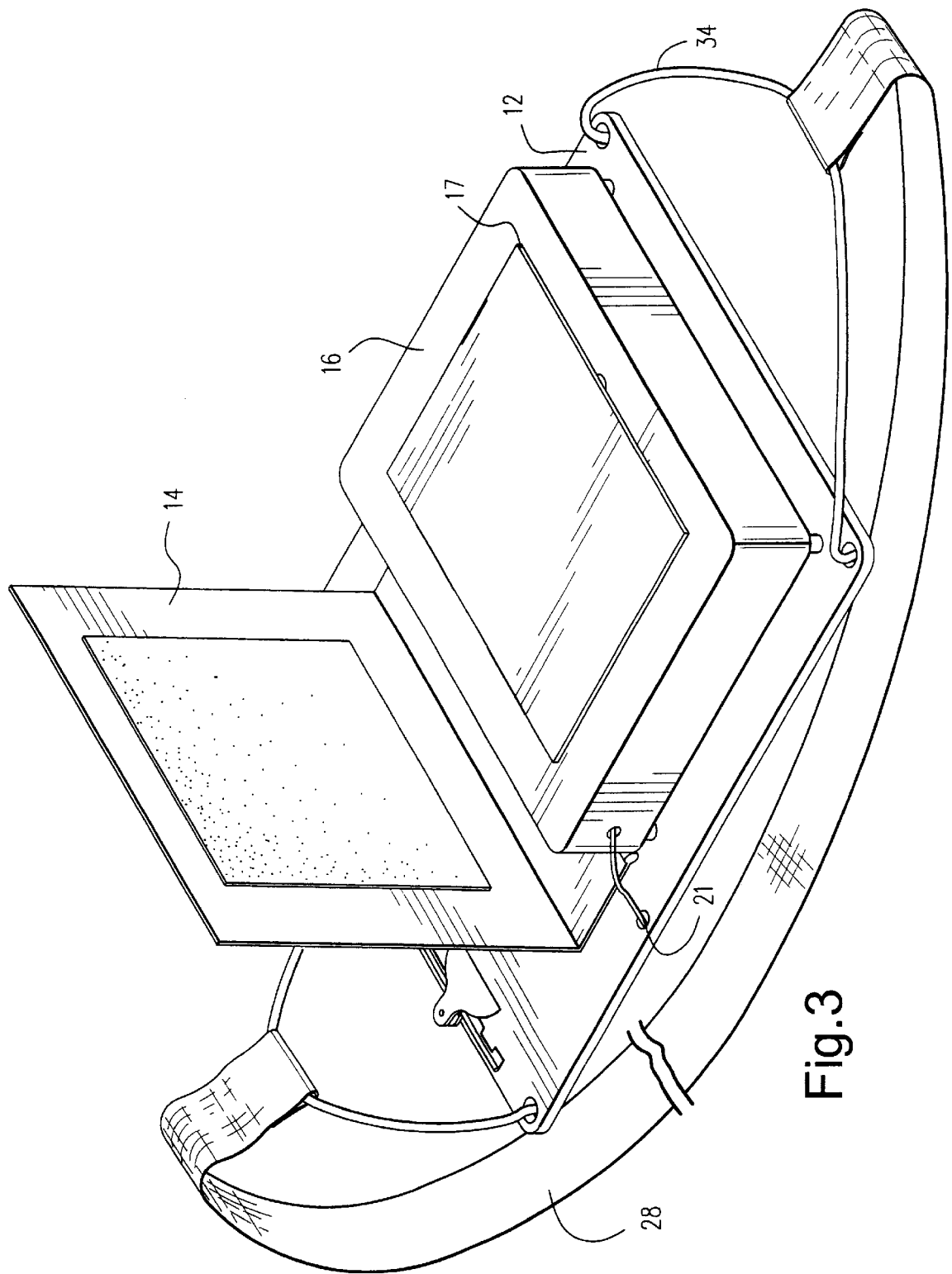
FIG. 3 shows a presentation view of the data entry apparatus as shown in FIG. 1.
Figure 4:
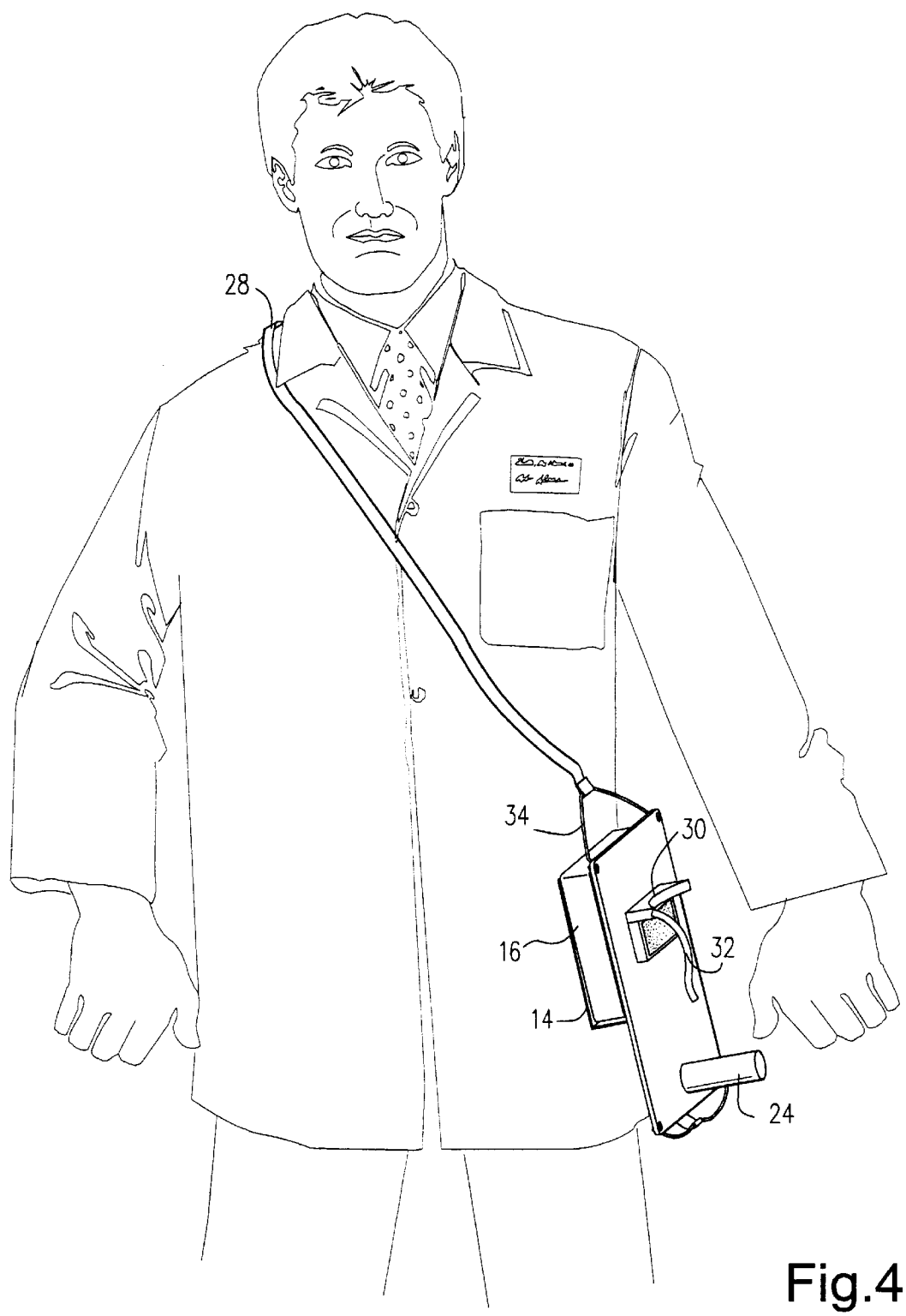
FIG. 4 shows the data entry apparatus, as shown in FIG. 1, worn by a user.

Referring now to FIG. 3, there is shown a perspective view of apparatus 10. Apparatus 10 may be worn by a user as shown in FIG. 4. One arm of the user is passed through strap 32 (FIG. 1) of a cast member 30 so that the handgrip member 24 may be held by the user's one arm to raise apparatus 10 to a data entry position. IN the data entry position, device 16 (FIG. 1) directly faces the user. The data entry position is generally referred to as presentation position. As can be seen, the user may grasp apparatus 10 by holding member 24 (FIG. 1) with a single hand, and enter data with a second hand via a user interface, such as for example, a touch sensitive screen, stylus or pen, and the like. It should be understood that a most preferred operating position, including other positions not illustrated, may actually be determined by the position the task is performed in. Accordingly, it may be assumed that respective embodiments of apparatus 10 may enable a wearer/user in a plurality of positions. FIG. 3 shows the support arrangement for a user's left forearm. It will be understood that this configuration can be easily configured for a right forearm by mounting the handgrip member and forearm cast in mirror image positions on the support panel 12.

Figure 5:
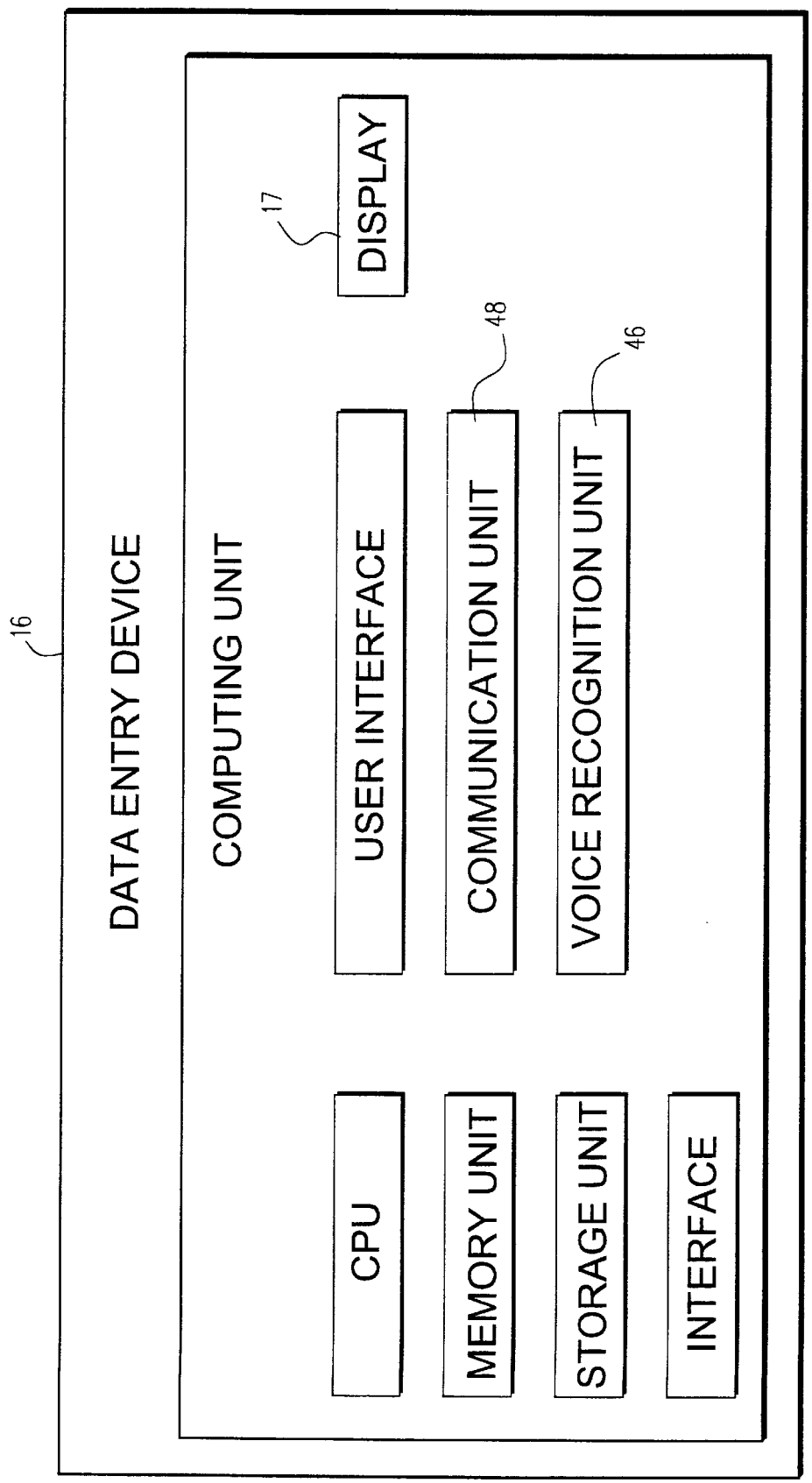
FIG. 5 is a schematic functional block diagram of an embodiment of the data entry apparatus.

FIG. 5 provides a detailed functional block diagram of an embodiment of the data entry device 16 as shown in FIG. 1. Device 16 may further include voice recognition unit for receiving voice input from the user and communication unit 48 for communicating with other devices.

Unlike the prior art wearable computer entry systems, this invention offers the safety advantages of being usable in a variety of field environments. Further, apparatus 10 can be quickly disassembled and discarded in the event of an emergency. Furthermore, apparatus 10 is carefully held together so that loose pieces do not get lost during inspections. Computer security is also provided to the present invention by using a standard industry cable lock assembly (not shown) that may be attached to a standard mounted slot of device 16.

The benefits of portable data entry apparatus as disclosed in FIG. 1 include enabling more than one person to observe the display 17 of device 16 without having to resort to special duplicate displays. This feature is important in the event that the data entry devices' output is the object of discussion among a small group of people.

The benefits also include the combination of ergonomic convenience to the plant floor user, robustness of the support panel to common factory hazards, and relatively low cost of implementation with a wide array of screen and voice data entry computers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A data entry apparatus adapted to be carried by a user, comprising:
   a planar member having a top surface and a bottom surface;
   a data entry device secured to the planar member along a top surface thereof and leaving a gap therebetween;
   a first member detachably secured to the planar member along the bottom surface thereof and towards a first edge of said planar member enabling a user to grip the apparatus;
   a second member secured to the planar member along the bottom surface thereof and away from the first edge, said second member enabling a user's forearm to support to said data entry apparatus;
   a strap for securing the user's forearm to said second member to prevent accidental dropping of said data entry apparatus; and
   a guard member attached to the second member for protecting the user's forearm.

2. A data entry apparatus adapted to be carried by a user, comprising:
   a planar member having a top surface and a bottom surface;
   a data entry device secured to the planar member along a top surface thereof and leaving a gap therebetween;
   a first member detachably secured to the planar member along the bottom surface thereof and towards a first edge of said planar member enabling a user to grip the apparatus;
   a second member secured to the planar member along the bottom surface thereof and away from the first edge, said second member enabling a user's forearm to support to said data entry apparatus; and
   said first member being secured to said planar member by a wingnut fastener.

3. The apparatus according to claim 2 including a strap assembly attached to said planar member by a rope harness, said strap assembly enabling a user to carry said data entry apparatus over a user's shoulder without using the user's hands.

4. The apparatus according to claim 2 wherein said first member extends in a direction normal to said planar member.

5. A data entry apparatus adapted to be carried by a user, comprising:
   a planar member having a top surface and a bottom surface;
   a data entry device secured to the planar member along a top surface thereof and leaving a gap therebetween;
   a first member detachably secured to the planar member along the bottom surface thereof and towards a first edge of said planar member enabling a user to grip the apparatus;
   a second member secured to the planar member along the bottom surface thereof and away from the first edge, said second member enabling a user's forearm to support to said data entry apparatus; and
   said data entry device being attached to said planar member so as to enable natural convection cooling and to minimize heat transmission to a user.

6. The apparatus of claim 5 wherein the dimensions of said planar member are greater than the dimensions of said data entry device.

7. The apparatus of claim 5 wherein said first member is attached such that said first is member extends normal to said planar member.

8. The apparatus of claim 5 further comprises:
   a strap assembly attached to said planar member by a rope harness, said strap assembly permitting a user to wear said apparatus over the user's shoulder.

9. The apparatus of claim 8 wherein said strap assembly further serves to provide vertical support for said apparatus in a data entry position.

10. A data entry apparatus adapted to be carried by a user, comprising:
- a planar member having a top surface and a bottom surface;
- a data entry device secured to the planar member along a top surface thereof and leaving a gap therebetween;
- a first member detachably secured to the planar member along the bottom surface thereof and towards a first edge of said planar member enabling a user to grip the apparatus;
- a second member secured to the planar member along the bottom surface thereof and away from the first edge, said second member enabling a user's forearm to support to said data entry apparatus;
- a strap assembly attached to said planar member by a rope harness, said strap assembly enabling a user to carry said data entry apparatus over a user's shoulder without using the user's hands;
- a stylus for enabling data entry;
- a clip member secured to the planar member for document retention; and
- a lock mechanism for securing the data entry device to said planar member.

11. The apparatus of claim 10 wherein the strap assembly enables a user to hold the data entry device in a presentation position.

12. A data entry apparatus adapted to be carried by a user, comprising:
- a planar member having a top surface and a bottom surface;
- a data entry computing device secured to the planar member along the top surface thereof leaving a gap therebetween;
- a first member detachably secured to the planar member along the bottom surface thereof and towards a first edge of said planar member, said first member being used as a handgrip member while said apparatus is mounted on the user's forearm;
- a second member secured to the planar member along the bottom surface thereof and away from the first edge, said second member enabling a user's forearm to support to said data entry apparatus;
- a protective member attached to said planar member, said protective member being disposed for movement between open and fold down positions to provide a visor to minimize reflections during data entry, said protective member further enabling protection of a display unit of said data entry device when said apparatus is hanging by a shoulder strap at the user's side.

13. The apparatus of claim 12, wherein said protective member provides abrasion protection to the display unit.

14. The apparatus of claim 12 wherein said first member is attached such that it is normal to said planar member.

15. The apparatus of claim 12 wherein said first member is a hard rigid member.

16. The apparatus of claim 12 wherein said second member includes a flexible strap.

* * * * *

UNITED STATES PATENT AND TRADEMARK OFFICE
CERTIFICATE OF CORRECTION

PATENT NO. : 6,734,842 B2
DATED : May 11, 2004
INVENTOR(S) : Woodmansee et al.

It is certified that error appears in the above-identified patent and that said Letters Patent is hereby corrected as shown below:

Column 6,
Line 59, delete "is" between "said first" and "member".

Signed and Sealed this

Thirteenth Day of July, 2004

JON W. DUDAS
*Acting Director of the United States Patent and Trademark Office*